United States Patent
Wang et al.

(10) Patent No.: US 7,637,623 B2
(45) Date of Patent: Dec. 29, 2009

(54) FLOOD LIT CLUSTER

(75) Inventors: Taochuan Bruce Wang, Novi, MI (US); Vyacheslav B. Birman, Auburn Hills, MI (US); Werner Eckardt, Rochester, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 138 days.

(21) Appl. No.: 11/625,455

(22) Filed: Jan. 22, 2007

(65) Prior Publication Data
US 2008/0089051 A1    Apr. 17, 2008

Related U.S. Application Data

(60) Provisional application No. 60/851,807, filed on Oct. 13, 2006.

(51) Int. Cl.
*G01D 11/28* (2006.01)
*G01D 11/00* (2006.01)
*G01D 13/22* (2006.01)

(52) U.S. Cl. .............................. 362/30; 362/26; 362/29; 116/288; 116/328

(58) Field of Classification Search .................. 362/26, 362/29, 30; 118/288, 328
See application file for complete search history.

(56) References Cited

U.S. PATENT DOCUMENTS

| 6,025,820 | A  | * | 2/2000  | Salmon et al. ............. 345/75.1 |
| 6,276,809 | B1 | * | 8/2001  | Matsumoto .................... 362/26 |
| 7,077,535 | B2 | * | 7/2006  | Wu ............................. 362/26 |
| 7,575,331 | B2 | * | 8/2009  | Birman et al. ................. 362/27 |
| 2002/0135994 | A1 | * | 9/2002 | Ikarashi et al. ................ 362/23 |
| 2004/0257790 | A1 |   | 12/2004 | Tanaka et al. |
| 2006/0126320 | A1 | * | 6/2006 | Fong et al. ..................... 362/27 |
| 2006/0238993 | A1 | * | 10/2006 | Obata et al. ................... 362/23 |

FOREIGN PATENT DOCUMENTS

| DE | 10153543 A1    | 5/2003 |
| EP | 0616922 A1     | 9/1994 |
| EP | 1610098 A1 *   | 12/2005 |
| EP | 1750054 A1     | 2/2007 |
| GB | 2406837 A      | 4/2005 |
| WO | WO 9909349     | 2/1999 |

OTHER PUBLICATIONS

International Search Report and Written Opinion of the International Searching Authority for International application No. PCT/US2007/061505 mailed Jul. 19, 2007.

* cited by examiner

*Primary Examiner*—Jong-Suk (James) Lee
*Assistant Examiner*—David J Makiya (57) ABSTRACT

An example light guide assembly for illuminating a display of an instrument cluster includes a light receiving portion, a light propagating portion and a reflective surface between the light receiving portion and the light propagating portion. The light receiving portion extends along a first axis, and the light propagating portion extends along a second axis which is transverse to the first axis. The reflective surface includes a stepped surface transverse to the reflective surface.

19 Claims, 7 Drawing Sheets

FLOOD LIT CLUSTER

CROSS-REFERENCE TO RELATED APPLICATIONS

This application claims priority to U.S. Provisional Application No. 60/851,807 filed Oct. 13, 2006.

BACKGROUND OF THE INVENTION

The present invention relates to a vehicle instrument cluster, and more particularly to a light guide assembly for an illuminated display.

An instrument cluster of a vehicle is traditionally located on a vehicle dashboard and includes several displays or dials that indicate various vehicle operating conditions. For example, an instrument cluster may include a speedometer, a tachometer, an engine condition indicator, and other known types of gauges. These gauges are illuminated to facilitate reading of information by the vehicle occupant.

Instrument clusters include a printed circuit board (PCB) with electronic components for controlling operation of the instrument clusters. Light sources, such as light emitting diodes (LEDs), are typically mounted to the PCB. A light housing is used to contain the light produced by the light sources inside the instrument cluster and prevent unwanted light leakage. The instrument cluster further includes a display or dial on which the graphical image is formed or mounted.

The instrument cluster may include a light guide formed as a piece of clear material which channels the light received from the light source and redistributes the light over the display. In addition, light guides are known which are utilized to simultaneously illuminate the display and a pointer, which is moveable relative to the display to indicate the current status of the vehicle operating condition.

Disadvantageously, known light guides have not satisfactorily provided proper illumination of both the pointer and the display. The distribution of the light through the pointer and over the display often lacks uniformity. A shortage of light for illuminating the pointer may occur because a disproportional amount of light is reflected within the light guide to illuminate the display. Therefore, an increased number of light sources may be required to provide the desired uniform light distribution.

Accordingly, it is desirable to provide an improved light guide assembly for a vehicle instrument cluster that adequately provides uniform light distribution of both a pointer and a display of the instrument cluster.

SUMMARY OF THE INVENTION

An example light guide assembly for illuminating a display of an instrument cluster includes a light receiving portion, a light propagating portion and a reflective surface between the light receiving portion and the light propagating portion. The light receiving portion extends along a first axis, and the light propagating portion extends along a second axis which is transverse to the first axis. The reflective surface includes a stepped surface which extends transverse to the reflective surface.

An example illuminated instrument cluster includes a display having a graphic, a pointer movable relative to the graphical image, a light source, and a light guide. The light guide includes a light receiving portion disposed along a first axis, a light propagating portion disposed along a second axis which is transverse to the first axis and a reflective surface. The reflective surface includes a stepped surface which extends along the second axis.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
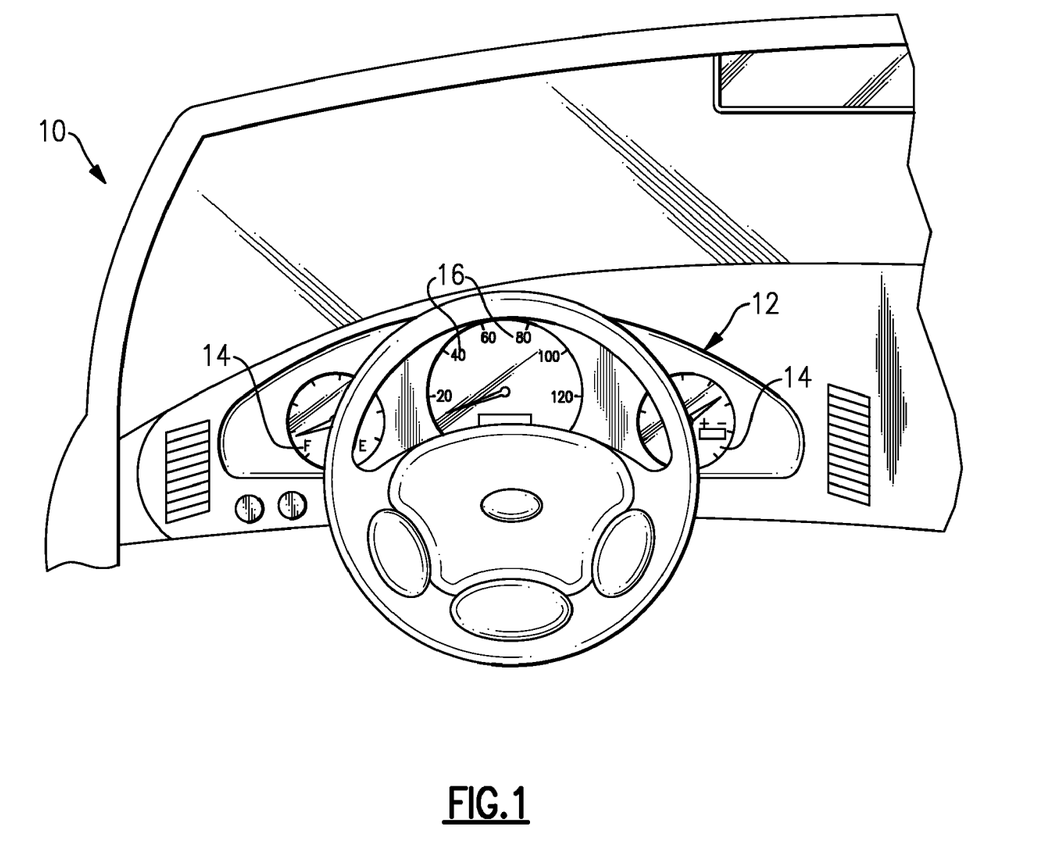
FIG. 1 illustrates selected portions of a vehicle having an example instrument cluster.

FIG. 1 illustrates selected portions of a vehicle 10 having an instrument cluster 12, such as a vehicle gauge cluster, that communicates vehicle information to occupants of the vehicle 10. In the illustrated example, the instrument cluster 12 includes a vehicle display 14 having a plurality of graphics 16, such as numbers, letters or symbols. At least a portion of the graphics 16 are illuminated from within the instrument cluster 12 for nighttime viewing or for aesthetic purposes, for example. In one example, the graphics 16 are printed on the display 14. In another example, the graphics 16 are insert molded to the display 14.

Figure 2:
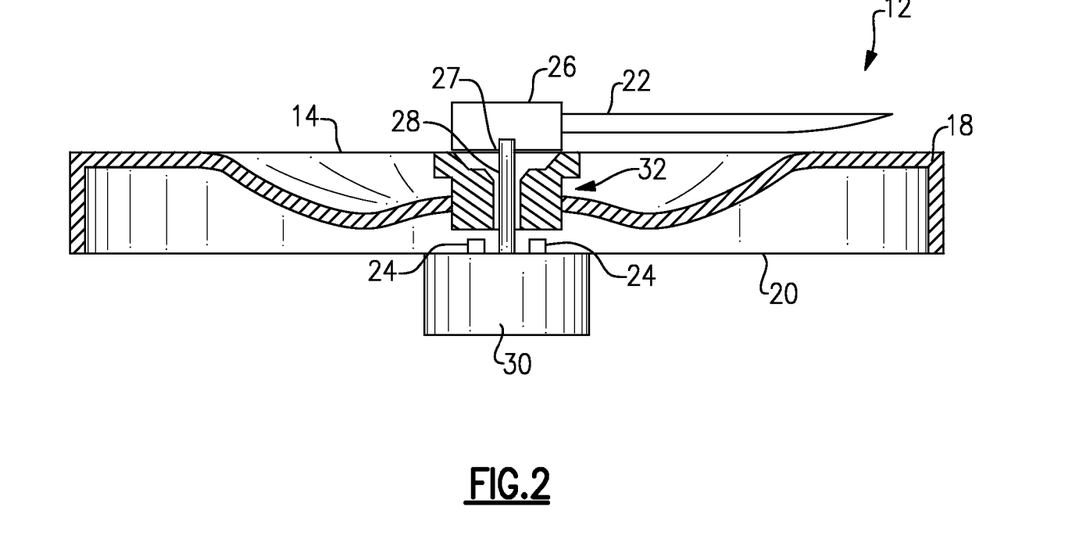
FIG. 2 illustrates a cross-sectional view of the example instrument cluster illustrated in FIG. 1.

FIG. 2 shows selected portions of the example instrument cluster 12, including a light housing 18 that supports the display 14 and a circuit board 20, such as a printed circuit board (PCB). A pointer 22 is mounted to the circuit board 20 for movement relative to the display 14 and is used to indicate the current status of the vehicle operating condition. The circuit board 20 also includes a light source 24 such as a light emitting diode (LED), for illuminating the display 14 and the pointer 22 simultaneously. However, other lighting types are contemplated as within the scope of the present invention.

When the instrument cluster 12 is assembled, the light sources 24 are mounted to the circuit board 20 and are aligned adjacent to a center 27 of the display 14. In one example, the light sources 24 are at least partially aligned with a housing 26 of the pointer 22. However, the light sources 24 may be positioned at other locations within the instrument cluster 12.

The pointer 22 is driven by a shaft 28 of a motor 30, such as a stepper motor, and is rotated to a desired position relative to the display 14 including the vehicle graphics 16. When activated, the light source 24 emits light. A light guide 32 receives the light from each light source 24, and uniformly disperses the light across the display 14 to evenly illuminate the vehicle graphics 16 of the display 14, as is further discussed below.

Figure 3:
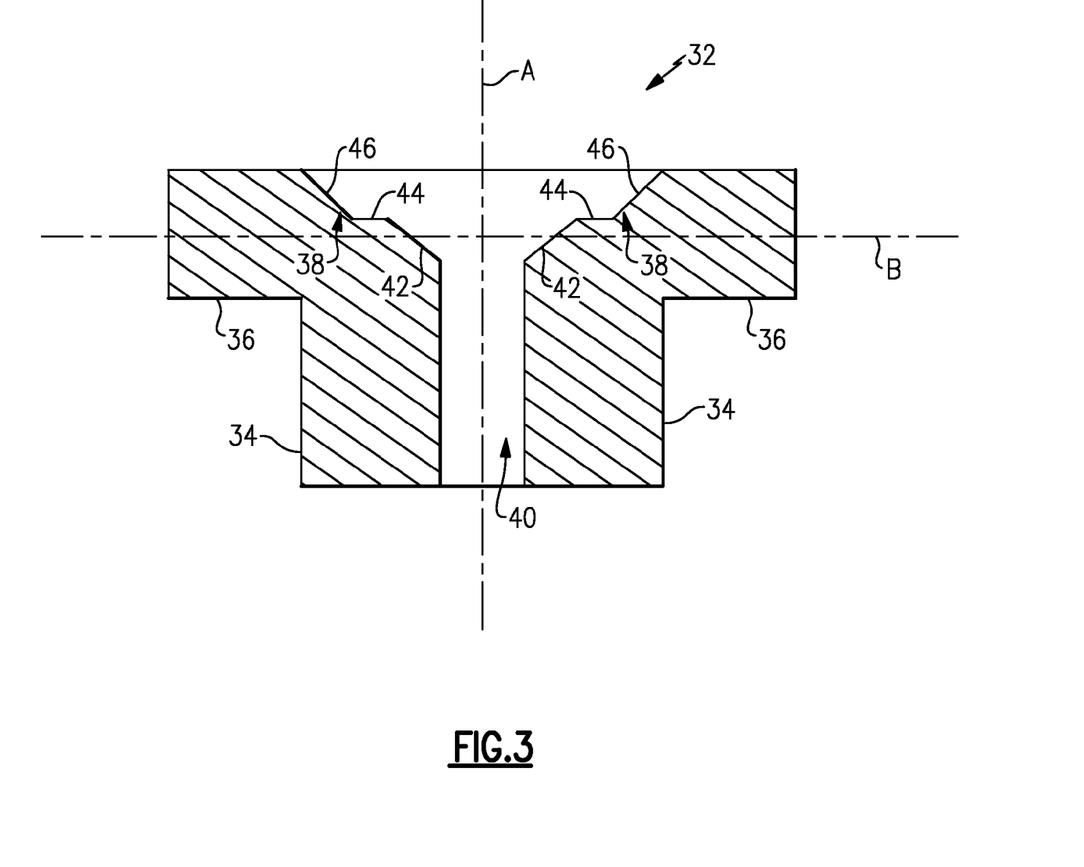
FIG. 3 illustrates a cross-sectional view of an example light guide assembly.

FIG. 3 illustrates the example light guide 32 which provides uniform illumination between the pointer 22 and the display 14 of the instrument cluster 12. The light guide 32 is formed from a transparent material, such as clear plastic, for example. The light guide 32 includes a light receiving portion 34, a light propagating portion 36 and a reflective surface 38.

Figure 6:
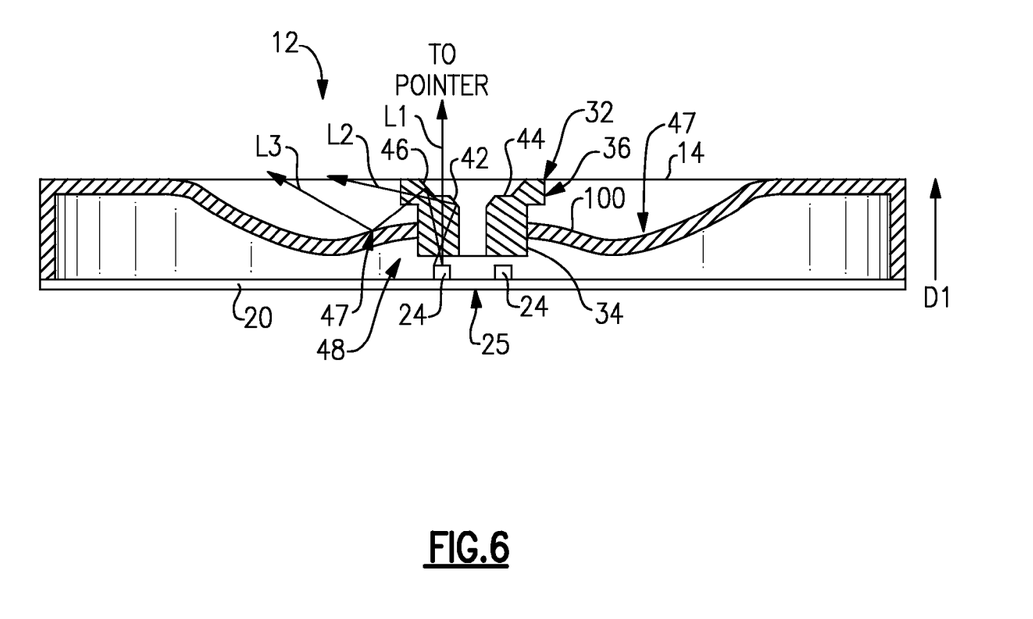
FIG. 6 illustrates a cross-sectional view of an instrument cluster including the example light guide assembly illustrated in FIG. 3.

The light receiving portion 34 is disposed along an axis A, which extends transverse to the display 14 where the light guide 32 is positioned within the instrument cluster 12 (see FIG. 6). The light propagating portion 36 extends along an axis B, which is generally parallel to the display 14. Axis B is perpendicular to axis A, in one example. The reflective surface 38 generally extends between the light receiving portion 34 and the light propagating portion 36.

An opening 40 extends through the center of the light receiving portion 34 along axis A. In one example, the light receiving portion 34 and the light propagating portion 36 are substantially cylindrical in shape (See FIG. 4). It should be understood that the light guide 32 is not shown to the scale it would be in practice. Instead, the light guide 32 is shown larger than in practice to better illustrate its function. A worker in this art would be able to determine an appropriate size, shape and configuration of the light receiving portion 34, the light propagating portion 36 and the reflective surface 38.

The reflective surface 38 includes a first inclined surface 42, a stepped surface 44, and a second inclined surface 46. In this example, the stepped surface 44 is positioned between the first and second inclined surfaces 42, 46. The example stepped surface 44 is positioned near the midpoint of the reflective surface 38. However, the stepped surface 44 may be positioned at any point along the reflective surface 38 and may be positioned exteriorly from the reflective surface 38, as is further discussed below with respect to FIG. 5.

The first and second inclined surfaces 42, 46 extend transversely to both axis A and axis B. The stepped surface 44 extends transversely relative to the inclined surfaces 42, 46. In one example, the stepped surface 44 extends parallel to the axis B. The stepped surface 44 permits a portion of light from light source 24 to escape through the light guide 32 and illuminate the pointer 22, as is further discussed below with respect to FIG. 6.

In one example, the first inclined surface 42 and the second inclined surface 46 are parallel to one another. In another example, the first inclined surface 42 and the second inclined surface 46 are transverse to one another. It should be understood that the actual positioning of the inclined surfaces 42, 46 may vary to alter the angle of reflection of light as light propagates through the light guide 32.

In addition, the size relationship between the stepped surface 44 and the inclined surfaces 42, 46 may be varied to control the surface ratio therebetween. A more uniform illumination of both the pointer 22 and display 14 is achieved by optimizing the surface ratio between the stepped surface 44 and the inclined surfaces 42, 46. A person of ordinary skill in the art having the benefit of this disclosure would be able to determine the appropriate surface ratio between the stepped surface 44 and the inclined surfaces 42, 46.

Figure 5:
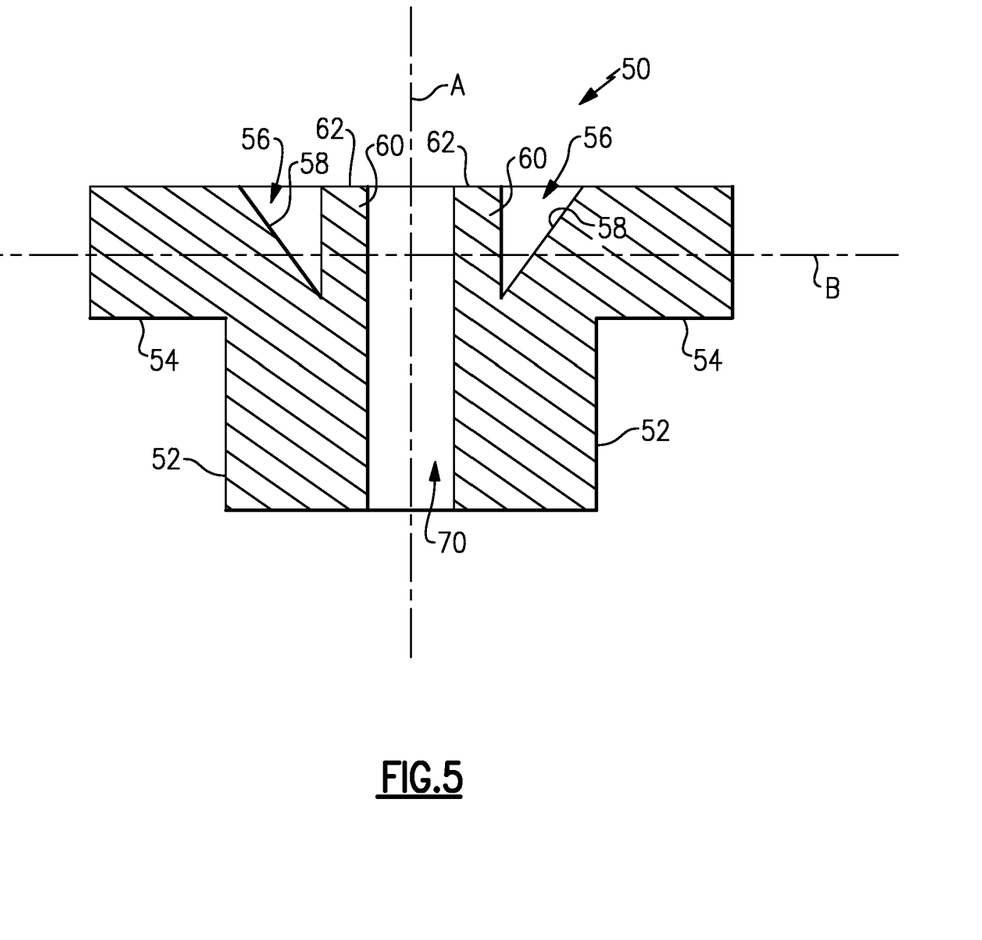
FIG. 5 illustrates another example light guide assembly.

FIG. 5 illustrates a second example light guide 50. The light guide 50 includes a light receiving portion 52 and a light propagating portion 54, which are identical to the light receiving portion 34 and the light propagating portion 36 of the light guide 32.

In addition, the light guide 50 includes a reflective surface 56. In this example, the reflective surface 56 includes an inclined surface 58 and a stepped surface 60. The stepped surface 60 is positioned between opening 70 and the inclined surface 58. The stepped surface 60 of the light guide 50 includes a flat portion 62 which extends parallel to axis B, in one example. The flat surface 62 is transverse to the inclined surface 58. The stepped surface 60 is positioned exteriorly to the inclined surface 58. The stepped surface 60 permits a portion of light from the light source 24 to escape the light guide 50 to illuminate a pointer 22.

Figure 4:
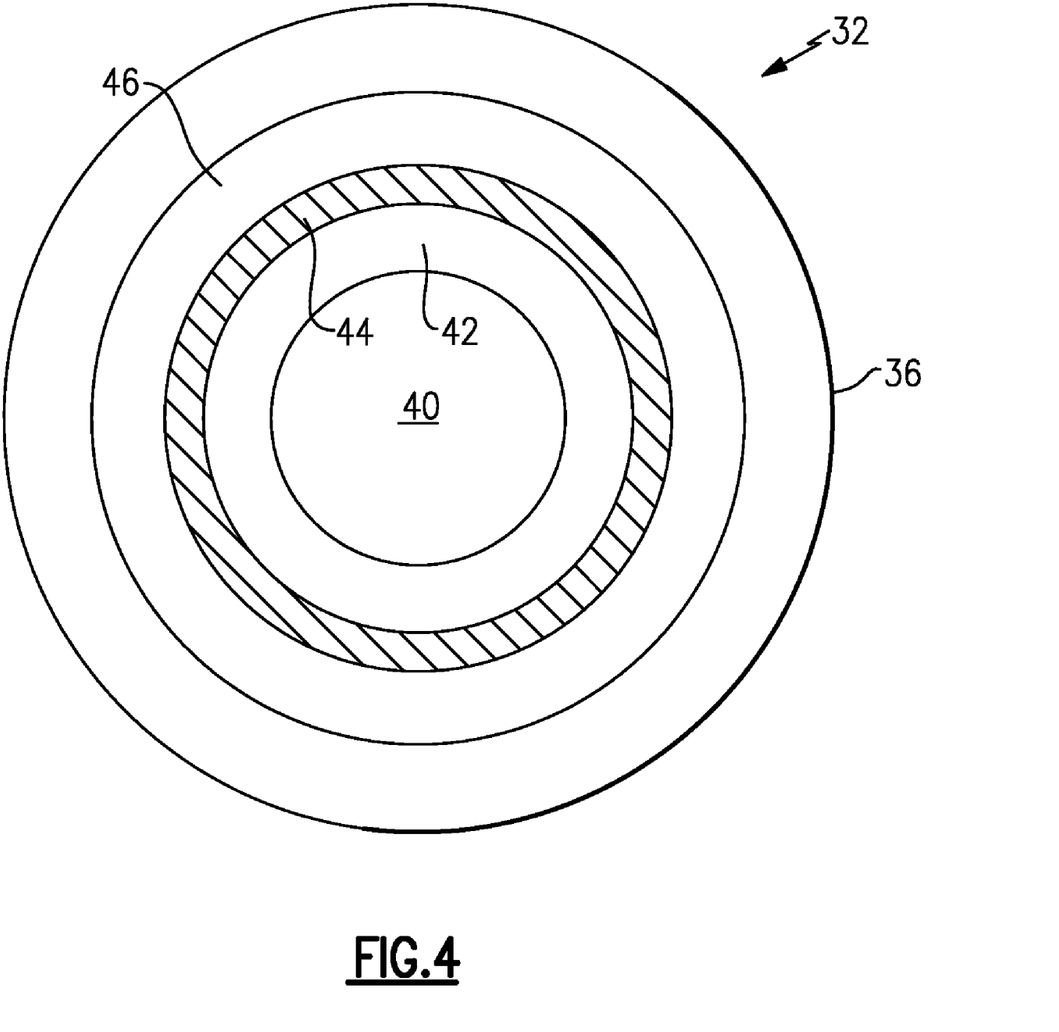
FIG. 4 illustrates a top view of the example light guide assembly illustrated in FIG. 3.

FIG. 6 illustrates an instrument cluster 12 utilizing the example light guide 32 (See FIGS. 3 and 4). The light housing 18 of the instrument cluster 12 includes a reflective surface 47, which extends between the circuit board 20 and the display 14. The reflective surface 47 extends circumferentially about a center 25 of the circuit board 20.

Figure 7:
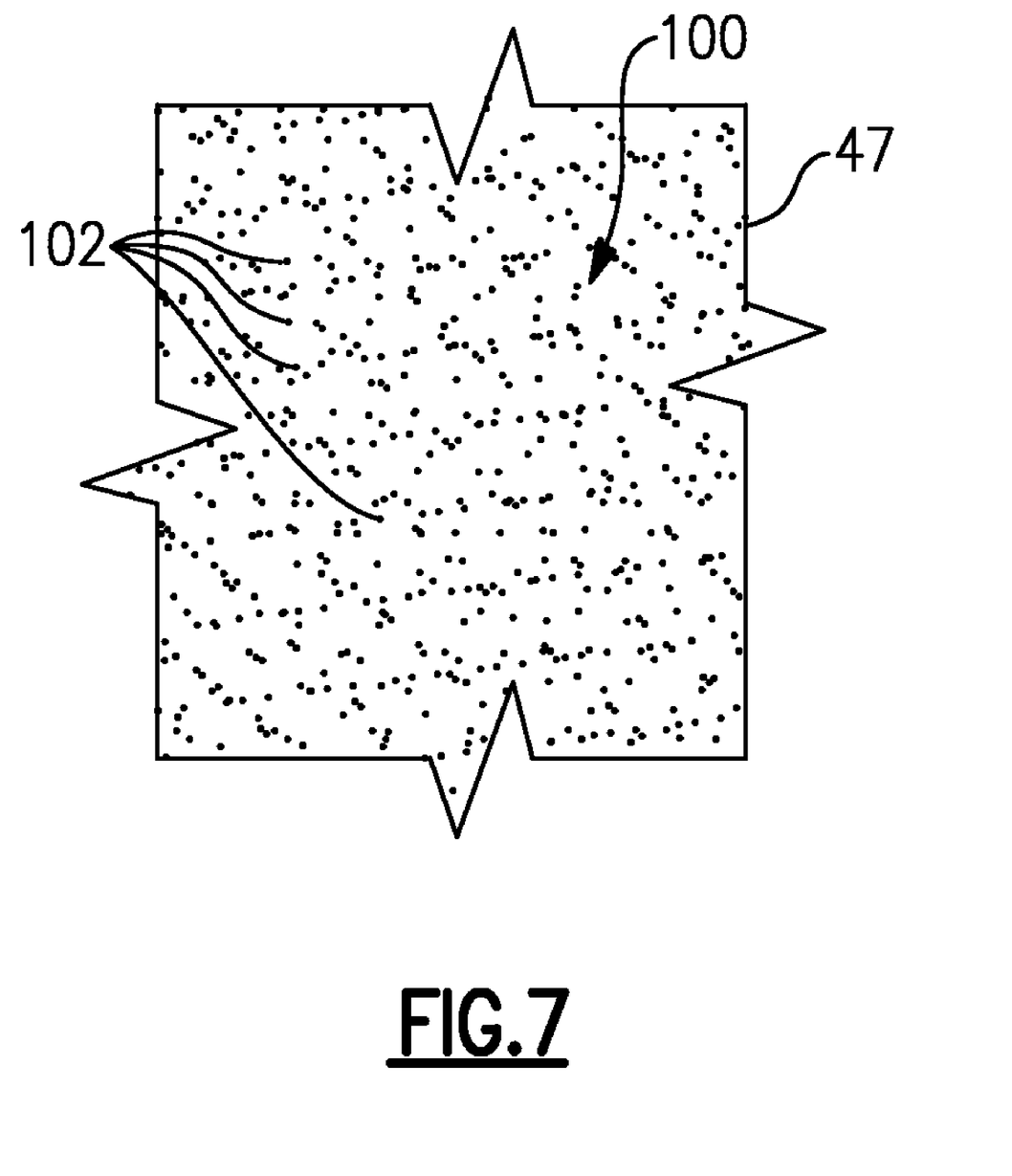
FIG. 7 illustrates a portion of a light housing of the instrument cluster illustrated in FIG. 6.

In one example, a portion of the reflective surface 47 of the light housing 18 may include a negative sloped section 100. The negative sloped section 100 is positioned adjacent to a center 25 of the circuit board 20 and extends from the center 25 toward the circuit board 20. In another example, the light housing 18 includes black dot texturing adjacent 102 (See FIG. 7) to the center 25 of the circuit board 20. In yet another example, the light housing 18 includes both the negative sloped section 100 and the black dot texturing 102. The negative sloped section 100 and/or black dot texturing 102 absorbs an increased amount of light near the light sources 24 of the display 14, thereby improving light efficiency and providing a more uniform light distribution across the display 14.

A plurality of light sources 24 are mounted to the circuit board 20 and positioned adjacent to the light guide 32. In one example, four light sources 24 are utilized to illuminate the instrument cluster 12. It should be understood that any number of light sources 24 may be utilized to provide the illumination necessary to adequately illuminate the instrument cluster 12.

Light from each light source 24 is communicated into the light receiving portion 34 in a direction D1, which is transverse to the display 14. A portion of the light L1 propagates up through the light guide 32, and is communicated through the stepped surface 44 to illuminate the pointer 22. A second portion of light L2 reflects off of the first and/or the second inclined surfaces 42, 46 of the light guide 32 to illuminate the display 14. A third portion of the light L3 reflects off at least one of the inclined surfaces 42, 46, then off of the reflective surface 47 of the light housing 18 to illuminate the display 14.

The example instrument cluster 12 provides for the simultaneous illumination of both the pointer 22 and the display 14. The stepped surface 44 provides improved light efficiency by more uniformly distributing the light from the light sources 24. A reduction of the number of light sources 24 needed to effectively illuminate the instrument cluster 12 is therefore achieved. Additionally, optimizing the surface area ratio between the stepped surface 44 and the inclined surfaces 42, 46 improves illumination of the pointer 22 and the display 14.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A light guide assembly for illuminating a display of an instrument cluster, comprising:
    a light receiving portion extending along a first axis;
    a light propagating portion extending along a second axis transverse to said first axis; and
    a reflective surface between said light receiving portion and said light propagating portion, said reflective surface including a stepped surface transverse to said reflective surface, wherein a portion of light is transmitted through the stepped surface of said light guide assembly to illuminate a pointer of the instrument cluster.

2. The assembly as recited in claim 1, wherein an exterior surface of said light propagating portion is at least partially cylindrical in shape.

3. The assembly as recited in claim 1, wherein a second portion of light reflects off said reflective surface and exits said light propagating portion to illuminate the display of the instrument cluster.

4. The assembly as recited in claim 1, wherein an opening extends through said light receiving portion along said first axis.

5. The assembly as recited in claim 4, wherein said stepped surface is positioned between said opening and an inclined surface, said stepped surface including a flat portion extending parallel to said second axis.

6. The assembly as recited in claim 5, wherein said inclined surface includes a first inclined surface and a second inclined surface with said stepped surface disposed between said first inclined surface and said second inclined surface.

7. The assembly as recited in claim 1, wherein at least one light source is positioned adjacent said light receiving portion.

8. An illuminated instrument cluster comprising:
a display including at least one graphic;
at least one pointer moveable relative to said at least one graphic;
at least one light source positioned to illuminate at least a portion of said at least one graphic; and
at least one light guide for directing light from said at least one light source to each of said at least one pointer and said display, said at least one light guide including a light receiving portion disposed along a first axis, a light propagating portion disposed along a second axis which is transverse to said first axis, and a first reflective surface, wherein said first reflective surface includes a stepped surface extending along said second axis which allows a portion of light to transmit through the stepped surface of said at least one light guide to illuminate said at least one pointer.

9. The cluster as recited in claim 8, comprising a circuit board supporting said at least one light source, and a light housing supported by said circuit board and including a second reflective surface extending between said circuit board and said display.

10. The cluster as recited in claim 9, wherein said second reflective surface of said light housing extends circumferentially about a center of said circuit board.

11. The cluster as recited in claim 9, wherein said second reflective surface of said light housing includes at least one of black dot texturing and a negative sloped section.

12. The cluster as recited in claim 8, wherein said first reflective surface at least partially extends between said light receiving portion and said light propagating portion.

13. The cluster as recited in claim 8, wherein an exterior surface of said light propagating portion is at least partially cylindrical in shape.

14. The cluster as recited in claim 8, wherein light from said at least one light source is directed into said light receiving portion, reflects off said first reflective surface and is directed into said light propagating surface prior to exiting said at least one light guide.

15. The cluster as recited in claim 14, wherein a portion of said light which exits said at least one light guide directly illuminates said display.

16. The cluster as recited in claim 8, wherein said at least one light source comprises a light emitting diode.

17. The cluster as recited in claim 8, comprising an opening extending along said first axis through said light receiving portion, wherein said stepped surface is positioned between said opening and an inclined surface of said first reflective surface, said stepped surface including a flat portion extending parallel to said second axis.

18. The cluster as recited in claim 8, wherein said first reflective surface includes a first inclined surface and a second inclined surface, said stepped surface extending parallel to said second axis between said first inclined surface and said second inclined surface.

19. The assembly as recited in claim 5, wherein said flat portion of said stepped surface is positioned at a midpoint of said reflective surface.

* * * * *